United States Patent [19]
Yoshikawa, et al.

[11] Patent Number: 5,424,124
[45] Date of Patent: Jun. 13, 1995

[54] CIVIL ENGINEERING AND CONSTRUCTION GRADE FIBROUS REINFORCING MATERIAL, METHOD FOR PRODUCTION THEREOF, AND CIVIL ENGINEERING AND CONSTRUCTION MATERIAL CONTAINING THE REINFORCING MATERIAL

[75] Inventors: Kazuo Yoshikawa; Tadatoshi Kurozumi; Shoji Kashiwagi, all of Kawasaki, Japan

[73] Assignee: Showa Denko K.K., Tokyo, Japan

[21] Appl. No.: 983,844

[22] PCT Filed: Jul. 8, 1992

[86] PCT No.: PCT/JP92/00879

§ 371 Date: Mar. 8, 1993

§ 102(e) Date: Mar. 8, 1993

[87] PCT Pub. No.: WO93/01143

PCT Pub. Date: Jan. 21, 1993

[30] Foreign Application Priority Data

Jul. 9, 1991 [JP] Japan .................................. 3-193547
Jul. 9, 1991 [JP] Japan .................................. 3-193548
Jul. 9, 1991 [JP] Japan .................................. 3-193550
Sep. 2, 1991 [JP] Japan .................................. 3-246540

[51] Int. Cl.$^6$ .................. C04B 14/38; C04B 16/06; C04B 20/10

[52] U.S. Cl. .................................. 428/361; 427/553; 427/558; 427/598; 427/212; 427/215; 428/378; 428/689; 428/697; 428/703; 501/95; 501/141

[58] Field of Search ............... 427/553, 558, 598, 212, 427/215; 428/361, 378, 689, 697, 703; 501/95, 141

[56] References Cited

U.S. PATENT DOCUMENTS

5,024,859  6/1991  Millard et al. .

FOREIGN PATENT DOCUMENTS

| | | |
|---|---|---|
| 0113861 | 7/1984 | European Pat. Off. . |
| 1533770 | 6/1968 | France . |
| 2448516 | 9/1980 | France . |
| 3226678 | 1/1984 | France . |
| 60-51645 | 3/1985 | Japan . |
| 60-54950 | 3/1985 | Japan . |
| 60-260449 | 12/1985 | Japan . |
| 2-74546 | 3/1990 | Japan . |
| 269205 | 3/1990 | Japan . |
| 3-114802 | 5/1991 | Japan . |
| 3-141140 | 6/1991 | Japan . |
| 3-174343 | 7/1991 | Japan . |
| 3-185179 | 8/1991 | Japan . |
| 2238321 | 5/1991 | United Kingdom . |

Primary Examiner—James C. Cannon
Attorney, Agent, or Firm—Oblon, Spivak, McClelland, Maier & Neustadt

[57] ABSTRACT

A civil engineering and construction fibrous reinforcing material having a metal oxide, metal hydroxide, and metal hydroxy-oxide fast deposited on a fibrous substance is practically useful as a substitute for asbestos. This material is produced by immersing the fibrous substance in a mixed solution of a metal salt and a solvent. Civil engineering and construction materials having the fibrous reinforcing material incorporated in inorganic refractory substances are used in the form of sheet-molded plates, for example.

28 Claims, No Drawings

CIVIL ENGINEERING AND CONSTRUCTION GRADE FIBROUS REINFORCING MATERIAL, METHOD FOR PRODUCTION THEREOF, AND CIVIL ENGINEERING AND CONSTRUCTION MATERIAL CONTAINING THE REINFORCING MATERIAL

TECHNICAL FIELD

This invention relates to a civil engineering and construction grade fibrous reinforcing material as a substitute for asbestos, a method for the production of the fibrous reinforcing material, and civil engineering and construction materials containing the fibrous reinforcing material.

BACKGROUND ART

Asbestos has found extensive utility in the field of construction. Asbestos excels in weatherability and refractoriness and has enough formability to permit easy production of various shaped articles for a wide variety of applications.

However, it has been ascertained that the asbestos is a factor injurious to health. Thus, the use of this material has come to be substantially banned.

In the circumstances, there is a strong desire for the supply of a substitute with properties like those of asbestos at a low price.

The following materials are known as substitutes for asbestos.

Materials intended to effect reinforcement of building materials:
(1) Fibers such as of vinylon, acryl, nylon, polymethyl pentene, polypropylene, polyethylene, carbon, Aramides, rayon, and phenol.
(2) Glass wool, rock wool, stainless steel wool, steel wool, gypsum, whiskers such as of potassium titanate, and ceramic fibers such as of alumina, alumina silica, and silica.
(3) Such natural mineral fibers as wollastonite, sepiolite, and attapulgite.
(4) Natural platelike materials represented by mica.

Materials intended to improve building materials in formability:
(1) Natural materials such as of cellulose, pulp, rayon, and hemp and fibrillation products thereof.
(2) Fibrillation products of synthetic fibers such as of polyethylene and polypropylene.

Materials intended to improve building materials in strength:
Fine silica powder, silica hume, and extremely fine cement powder.

Materials intended to increase volume:
Silica sand, calcium carbonate, etc.

Typical Japanese Patent Public Disclosures covering these materials are shown below.

Japanese Patent Public Disclosure No. 174343/1991 discloses a composition which comprises whiskers (such as of carbon, silicon carbide, silicon nitride, alumina, and potassium titanate) and an aggregate of particles having an average diameter not more than two times the diameter of the whiskers.

Japanese Patent Public Disclosure No. 114802/1991 discloses a method which comprises molding diatomaceous earth in the form of scales, converting the scales into pellets not more than 6 mm in diameter or rolling them to a thickness not more than 4 mm, mixing the resultant particles with portland cement and/or lime, fibers, and an extrusion auxiliary, adjusting the water content of the resultant mixture, and molding the mixture in a stated shape. It further discloses as fibers for use in the method described above inorganic substances such as asbestos, glass fibers, carbon fibers, and wollastonite, and pulp, polypropylene, polyvinyl alcohol, Kepler, and polyethylene fibers.

Japanese Patent Public Disclosure No. 141140/1991 discloses a composition which comprises polyvinyl alcohol type fibers or polyamide fibers and a synthetic pulp, wherein a study of the amounts and ratios of these components relative to the total amount of the composition enabled the composition to acquire improved ability of filtration as determined by a test for filtrability to water. It further discloses additives (such as, for example, mica, wollastonite, slag, silica, bentonite, and pearlite).

Japanese Patent Public Disclosure No. 54950/1985 discloses that the product obtained by preliminarily imparting minute grooves and ridges to the surfaces of fibers and subjecting the fibers to electroless plating thereby depositing such metal as Au, Ag, Cu, Ni, Co, Pd, or Sn on the fibers is used as a cement type reinforcing material.

The product resulting from the treatment just mentioned is expensive and entails both the step for imparting a rough surface and the step for plating.

Japanese Patent Public Disclosure No. 74546/1990 discloses that asbestos-free $SiO_2$—$MgO$—$CaO$—$Al_2O_3$ type mineral fibers are produced by extrusion molding a mixture of cement, a siliceous raw material, and an extrusion auxiliary and that these fibers have a length of not more than 1 mm.

Japanese Patent Public Disclosure No. 69205/1990 discloses that the product obtained by preparing a composition of cement and silica, combining this composition with 8 to 13% of natural fibers of wollastonite or zeolite, and mixing the resultant blend with necessary additives, not including asbestos, is practically used.

Various known methods have been described. None of these methods, however, produces a material which equals asbestos in performance and is available as inexpensively as asbestos.

Vinylon, for example, possesses a hydroxyl group within the molecular unit thereof and consequently abounds in hydrophilicity and, when mixed with cement, thoroughly disperses therein. Since it is chemically active, however, it is deficient in stability. Polyethylene and polypropylene lack a hydroxyl group and do not exhibit high dispersibility in water. The idea of using a surfactant, for example, may be conceived for the elimination of these drawbacks. This idea, however, lacks practicability.

None of the materials developed heretofore is capable of substituting in its unmodified form for asbestos.

An object of this invention is provide a material which can be used in its unmodified form as a substitute for asbestos and is advantageously used particularly in civil engineering and construction grade materials.

DISCLOSURE OF THE INVENTION

The inventors have found that a fibrous material having a metal oxide, a metal hydroxide, or a metal hydroxy-oxide deposited fast on a fibrous substance fulfills the object of this invention mentioned above, that this fibrous material can be produced by a process comprising a step of mixing at least one metal salt with a solvent, a step of immersing a fibrous substance in the mixed solution obtained by the preceding step, a step of imparting an energy to the mixed solution and/or a step of adjusting the pH value of the mixed solution, and a step of dehydrating the resultant mixed solution or a process comprising a step of extracting the fibrous substance from the step of immersion mentioned above and a step of imparting energy to the extracted fibrous substance, and that an inorganic refractory substance containing the fibrous material mentioned above forms civil engineering and construction materials of excellent quality. This invention has been completed as a result.

BEST MODE FOR CARRYING OUT THE INVENTION

Now, this invention will be described in detail below.

First, the method for the production of a civil engineering and construction grade fibrous reinforcing material contemplated by this invention will be described. This method starts with the mixture of a metal salt with a solvent. The solvent in this case is most practically water. A polar solvent such as ethyl alcohol may be used instead.

The metal which forms a metal salt on mixture with water is a transition metal belonging to the third or higher period in the Periodic Table of the Elements. Preferably, this metal possesses electron orbits of at least d coordinate and consequently assumes a stable state and a metastable state. In this case, the ion of this metal is desired to assume the form of both a high order ion and a low order ion (namely a plurality of electric charges) in a solution.

The metals which answer the description given above are Si, Ti, V, Cr, Mn, Fe, Co, Ni, and Cu. At least one member selected from among these metals is used. Al is also usable. And Fe is preferably used. In the metal oxide, hydroxide, or hydroxy-oxide mentioned above, Fe is in the divalent or trivalent form.

For the salt, chlorine is the optimum nonmetallic moiety thereof because it has a high Clark number and is inexpensive and because it occurs abundantly as a component of seawater in the natural world. As the basic moiety of the salt, such inorganic ions as sulfuric acid ion, sulfurous acid ion, nitric acid ion, nitrous acid ion, phosphoric acid ion, phosphorous acid ion, and hypophosphorous acid ion and organic ions such as of oxalic acid, tartaric acid, and citric acid are usable.

Now, the energy to be imparted will be described.

Physically, the energy impartation is accomplished by convective conduction of heat, heat treatment for supplying thermal energy, irradiation with heat waves such as infrared rays for radiant supply of energy, use of energy waves of short wavelength (such electromagnetic waves as very high frequency waves, ultrahigh frequency waves, microwaves, or millimeter waves) for inducing an electric field or magnetic field, and excitation with ultraviolet light or electron beam for activation of ions in a substrate or a solution, for example.

For the fast deposition of a metal oxide, metal hydroxide, or metal hydroxy-oxide on the fibrous substance by immersion of the fibrous substance in the solution of the metal compound, such chemical methods as causing the presence of a metallic ion in the solution, the presence of a fine floating precipitate (colloid) in the solution, the precipitation of a colloid through pH adjustment, the precipitation of a metallic component by use of a reducing agent, and the activation of a metallic ion in a highly oxidized state may be adopted. One or more of these methods of physical energy impartation and chemical energy impartation can bae used.

Though use of one metallic component generally suffices, a combination of metal salts such as a combination of iron (III) chloride with iron (II) chloride, that of iron (III) chloride with aluminum chloride, or that of iron (III) chloride with calcium chloride or a combination of an inorganic substance with an organic substance such as a combination of iron (III) chloride with emulsion may be used.

Though use of one basic component generally suffices, the copresence of a plurality of basic components such as the combined use of iron (III) chloride and iron (III) sulfate or that of iron (III) chloride with iron hydroxide is permissible.

The material (substrate) on which the metal compound component is deposited fast is not basically limited. It is, however, important that this material should avoid inducing such adverse phenomena as degeneration, dissolution, and elution under prevalent reaction conditions (such as temperature and pH).

Now, concrete examples of the materials which are usable effectively herein are cited below.

Polyolefins—Polyethylene, polypropylene, polybutene, and polymethyl pentene

Other synthetic fibers—Polyvinyl alcohol, polyacrylonitrile, nylon-6, nylon-66, polyester, polyvinyl chloride, and polyamide Semi-manmade fibers—Rayon and acetate Natural organic substances—pulp, cotton, cellulose, wool, seed skin fibers, hemp, ramie, Manila hemp, flax, sisal hemp, mohair, and cashmere Manmade mineral substances—Slag wool, rock wool, glass fibers, carbon fibers, metal fibers, fibers of such ceramic substances as alumina, silica alumina, and silica, gypsum, and whiskers of potassium titanate Natural ores—Mica, wollastonite, zeolite, and attapulgite These examples are cited such that the term "polypropylene", for example, includes not only the homopolymer itself but also copolymers of propylene severally with ethylene, butene, pentene, and 4-methyl pentene-1, and modified polypropylenes obtained by modifying polypropylene with acid anhydrides such as maleic anhydride (hereinafter polypropylene fibers and other polyolefin fibers are termed in the above sense).

As regards the other substances mentioned above, they embrace substances using the substances as a main component and products of the reaction thereof and mixtures thereof with other components, besides the substances in their simple form.

Practically, polyolefin fibers are desirably selected and among polyolefin fibers polypropylene fibers are preferably adopted.

The method of this invention substantially comprises a step of mixing a metal salt with a solvent, a step of immersing a fibrous substance in the resultant mixed solution, a step of imparting an energy to the mixed solution and/or adjusting the pH value thereof, and a step of dehydrating the treated mixed solution as described above. Though the sequence of these steps is generally as just described, it may be altered so that the step of impartation of energy and/or adjustment of pH precedes the step of immersion.

A component which possesses a buffering action may be added to the mixed solution for the purpose of controlling the pH thereof. A component capable of forming a complex ion may be additionally used for the purpose of keeping the metal salt solution in a stable state of solution. The fibers to be treated may have preparatorily attached thereto a hydrophilic group such as of a surfactant.

In the civil engineering and construction grade fibrous reinforcing material which is produced by the method of this invention, the gravimetric ratio of the fibrous substance to the metal oxide, hydroxide, or hydroxy-oxide is practically in the range of from 1:0.0001–0.2. If the gravimetric ratio deviates from this range, the effect of the use of the metallic compound is not fully manifested when the amount of the metallic compound deposited fast on the fibrous material is too small. In the treatment of such hydrophilic fibers as vinylon fibers, the effect of improving the workability of the fibrous material in the formation of sheet is not fully attained.

In the case of hydrophobic fibers, the hydrophilicity and workability of sheet formation can be improved by appropriately increasing the amount of metal compound for fast deposition on the fibrous material.

No further addition to the hydrophilicity is attained after the metal compound has been deposited over the entire surface of the fibrous substance. Thus, the effect is saturated outside the range mentioned above.

The organic fibers to be treated may possess a diameter approximately in the range of from $0.1\mu$ to $5\mu$ (very fine fibers), a diameter approximately in the range of from 5 to $35\mu$ like fibers popularly used for construction materials, or a diameter approximately in the range of from 35 to $100\mu$ (thick fibers).

The deposition of the metal compound on the fibrous material may be carried out batchwise or continuously.

The civil engineering and construction grade fibrous reinforcing material of this invention possesses the following characteristics.

(1) It exhibit an outstanding sequestering property to hydraulic materials resulting from the combination of cement fly ash, slag, gypsum, and silica kneaded with water, siliceous inorganic materials, and materials of clay. It also exhibits this excellent sequestering property to such molding auxiliary materials as pulp, cellulose, and mineral fibers.

(2) It can therefore be combined with the substances mentioned above to permit easy production of civil engineering and construction materials possessing ideal properties. The sheet-forming method can be adopted for the production of these materials.

(3) Various kown processes such as firing, hydrothermal curing, and watertight curing (autoclaving) can, as required, be adopted in the production of these materials.

(4) The civil engineering and construction materials contemplated by this invention can, when necessary, incorporate various additives therein.

Now, the civil engineering and construction materials which are contemplated by this invention will be described below.

The civil engineering and construction materials have as a component (a) an inorganic refractory substance and as a component (b) the civil engineering and construction grade fibrous reinforcing material which is incorporated in the component (a).

The amount of the civil engineering and construction grade fibrous reinforcing material to be incorporated in the civil engineering and construction material is varied with the kind of the material to be treated. This will be discussed below with reference to a cement-based material. The amount of the component (b) to be incorporated is indicated in terms of % by weight based on the amount of the component (a).

(1) When organic fibers are used as a material for application to the surface of a wall, the amount of the material is in the range of from 0.01% to 1% based on the amount of cement. In the case of very fine fibers having a diameter approximately in the range of from 0.1 to $1\mu$, they can manifest the effect as expected when the amount thereof is approximately in the range of from 0.01 to 0.2%. Even with the very fine fibers of the kind known currently in the art, the effect is not manifested if the amount thereof is less than 0.01%.

(2) The behavior of the fibrous reinforcing material to be manifested in the production of molded plates such as extrusion molded plates, sheet molded plates, and press molded plates will be described below.

Generally, organic synthetic fibers are used in an amount approximately in the range of from 0.5 to 3% and natural fibers such as pulp approximately in the range of from 2.5 to 10%. In the case of inorganic fibers, the amount thereof to be used is approximately in the range of from 5 to 20%.

When the material is in the form of inorganic plates, the amount of fibers to be used is approximately in the range of from 10 to 40%.

(3) When the fibrous reinforcing material is used in an amount exceeding 40% based on the amount of cement, the effect of the use thereof is lost because the moldability and physical properties are saturated and the cost of production is boosted.

The amount of the fibrous reinforcing material to be added is substantially the same in the case of a hydraulic substance, other than cement, a siliceous material, or a clayish material, not less than 0.01% and not more than 40% to be specific. It is in this range that the civil engineering and construction grade treating material of this invention manifests the expected effect.

Though no particular limits are set on the length of the individual fibers of the component (b), fibers of a length in the range of from 1 mm to 50 mm are generally used for the component (b) where the material is to be mixed with cement, for example.

Although fibers not exceeding 1 mm in length are advantageous in the respect that random distribution is easily attained, they are nevertheless disadvantageous because the need to cut them etc. increases costs.

Fibers exceeding 50 mm in length are undesirable because that they are liable to cohere and form fiber balls in the process of mixture.

A mat of a large thickness may be formed by the use of a Fourdrinier machine, an extrusion molding machine, or a press molding machine and this mat may be used as a plate.

Now, this invention will be described more specifically below with reference to working examples and comparative experiments.

EXAMPLE 1

Iron (III) chloride (anhydrous) was dissolved in water to prepare an aqueous solution containing iron (III) chloride at a concentration of 10 g/liter. Then, 50 g of polypropylene fibers ($18\mu$ in diameter and 1 m in length) were immersed in the aqueous solution and heated as immersed therein at 80° C. for 10 minutes. At the end of the heating, the solution was found to have a pH value of 1.8. Then, the fibrous substance was extracted from the immersing solution and dried. The fibrous substance was a fibrous reinforcing material which comprised polypropylene fibers and a mixture consisting of iron oxide, iron hydroxide, and iron hydro-oxide covering the surface of the fibers and, therefore, conformed to the present invention. It was found that the amount of the iron compounds deposited fast on the polypropylene fibers was 1.0 to 1.1 g, based on 100 g of the polypropylene fibers. The thickness of the film of iron compounds was $0.01\mu$ and the iron forming the iron compounds was predominantly trivalent. The mixture was analyzed by the atomic absorption method.

EXAMPLE 2

The treatment of polypropylene fibers was carried out by following the procedure of Example 1, except that iron (II) chloride (anhydrous) was used in the place of iron (III) chloride (anhydrous). The fibers were extracted after 60 minutes' immersion. Consequently, a fibrous reinforcing material of this invention substantially identical to that of Example 1 was obtained. At this time, the pH value of the immersing solution was found to be 3.7. It was confirmed that the speed of deposition was markedly enhanced by adjusting the pH value to near 2.0 and adding hydrogen peroxide.

EXAMPLE 3

The treatment of polypropylene fibers was carried out by following the procedure of Example 1, except that the heating was performed not in the immersing solution but in the aqueous iron chloride solution prior to the immersion. Consequently, a fibrous reinforcing material of this invention substantially identical to that of Example 1 was obtained.

EXAMPLE 4

The treatment of polypropylene fibers was carried out by following the procedure of Example 1, except that the temperature of heating was changed to 60° C. and the time of heating to 30 minutes. Consequently, a fibrous reinforcing material of this invention substantially identical to that of Example 1 was obtained.

EXAMPLE 5

The treatment of polypropylene fibers was carried out by following the procedure of Example 1, except that the immersing liquid was irradiated with 2,450 MHz electromagnetic waves as an energy wave at the rate of 1,200 W/hr instead of being heated. Consequently, a fibrous reinforcing material of this invention substantially identical to that of Example 1 was obtained.

EXAMPLE 6

The procedure of Example 1 was repeated, except that the solution of iron (III) chloride in water, the immersion of polypropylene fibers, and the standing of the fibers in the immersing solution were all performed at normal room temperature. When the time of immersion was varied, the following results were obtained.
1. One hour—Virtually no coloration observed (amount of deposition not more than 0.01 g/100 g)
2. One day—Virtually no coloration observed (amount of deposition not more than 0.01 g/100 g)
3. One week—Slight coloration observed (amount of deposition 0.06 g/100 g)
4. Two weeks—Denser coloration observed (amount of deposition 0.3 g/100 g)
5. Four weeks—As dense coloration as in Example 1 (amount of deposition 1 g/100 g)

The results indicate that the reaction can be effectively performed at normal room temperature, though the reaction time increases.

The amount of the iron compound deposited fast is closely related to the degree of coloration. Thus, the amount of deposition can be estimated from the degree of coloration.

EXAMPLE 7

The procedure of Example 1 was repeated, except that fibrillated polyethylene fibers (2 mm in length) were used in the place of the polypropylene fibers. As a result, a fibrous reinforcing material which comprised polyethylene fibers and a mixture consisting of iron oxide, iron hydroxide, and iron hydroxy-oxide covering the fibers, and which conformed to this invention, was obtained. In this material, the gravimetric ratio of the substrate of polyethylene fibers and the coating of iron compounds was 100:0.5. The thickness of this coating was $0.005\mu$ and the iron forming the coating was predominantly trivalent.

EXAMPLE 8

The procedure of Example 1 was repeated, except that various types of fibers indicated in Table 1 were used severally in the place of the polypropylene fibers. As a result there were obtained fibrous reinforcing materials that were substantially identical except for the type of fiber.

TABLE 1

| | Name of fiber | Length (mm) | Diameter ($\mu$m) |
|---|---|---|---|
| 1 | Polymethyl pentene | 5 | 18 |
| 2 | Vinylon | 5 | 16 |
| 3 | Acryl | 5 | 16 |
| 4 | Glass | 12 | 10 |
| 5 | Slag wool | 3 | 3 |

EXAMPLE 9

The procedure of Example 4 was repeated, except that the treatment of the fiber immersed in the solution was effected by irradiation with the following energy waves instead of the heat treatment. As a result, fibrous reinforcing materials of this invention substantially identical to the material of Example 4 were obtained.

| | Kind of electromagnetic waves | Condition of irradiation |
|---|---|---|
| A | 950 MHz electromagnetic waves | 1,200 W/hr |
| B | Ultraviolet light | 600 W/hr |

EXAMPLE 10

The same polypropylene fibers as used in Example 1 were treated under the conditions shown in Table 2 by following the procedure of Example 1, except that $Fe_2(SO_4)_3$ and $Fe(NO_3)_3$ were used in place of the iron chloride.

TABLE 2

|   | Concentration of aqueous solution (g/liter) | Heating time (min.) | Heating temperature (°C.) |
|---|---|---|---|
| A | $Fe_2(SO_4)_3$ | 50 | 60 | 80 |
| B | $Fe(NO_3)_3$ | 50 | 60 | 80 |

As a result, fibrous reinforcing materials of this invention possessing deposited coatings formed mainly of iron hydroxy-oxide were obtained.

EXAMPLE 11

A fibrous reinforcing material of this invention was obtained by the following treatment using $CuCl_2$.

An aqueous solution containing copper chloride at a concentration of 10 g/liter (pH=4.5) was adjusted to pH 2 by addition of hydrochloric acid. The aqueous solution and hydrogen peroxide added thereto were heated to 80° C. Then, polypropylene fibers were immersed in the solution at the rate of 50 g/liter and kept immersed therein at 80° C. for 30 minutes. Subsequently, the fibers were taken out of the solution and dried. As a result, a fibrous reinforcing material of this invention was obtained.

EXAMPLE 12

A fibrous reinforcing material of this invention was obtained by substantially following the procedure of Example 11, except that $NiCl_2$ was used in the place of $CuCl_2$.

The fibrous reinforcing materials of this invention produced in Examples 1 to 12 described above were all found to excel in coloration, color stability, stability against thermal shocks due to repeated cycles of high and low temperatures, stability against thermal shocks due to repeated cycles of freezing and thawing, stability against chemicals, and dispersibility in water.

These properties were tested by the following methods.

Test for coloration:
A given sample was visually examined to determine the uniformity of coloration.

Test for stability of coloration:
A sample was washed with water and kept immersed in 1% soap water at room temperature for ten days. It was removed from the soap water and compared as to change of coloration with a sample which had been kept immersed in plain water under the same conditions to confirm the absence of decolorization.

Test for stability against repeated cycles of high and low temperatures:
A sample was subjected to ten cycles each of a set of one hour's standing at 20° C. and one hour's standing at 80° C. It was then visually examined to determine absence of change in color.

Test for stability against freezing and thawing:
A sample was subjected to five cycles each of a set of one hour's standing at −20° C. and one hour's standing at 100° C. It was then visually examined to determine absence of change in color.

Test for stability against chemicals:
A sample was kept immersed in an aqueous 3% hydrochloric acid solution or an aqueous 3% sodium hydroxide solution at 50° C. for one hour. It was then visually examined to determine absence of change in color.

Test for dispersibility in water:
One (1.0) part of sample fibers were placed in 100 parts of water and agitated therein. The resultant mixture was visually examined as to the condition of dispersion of fibers to determine satisfactory dispersion of the fibers.

EXAMPLE 13

An aqueous solution containing iron (III) chloride (anhydrous) at a concentration of 1 g/liter and a cationic emulsion containing acrylic ester resin in a concentration of 0.5 g/liter were combined and heated to 80° C. In the heated mixed solution, polypropylene fibers added thereto at a ratio of 10 g/liter were kept under the same conditions for 10 minutes. The fibers in the mixed solution were irradiated with 2,450 MHz microwaves at the rate of 1,200 W/hr for five minutes. It was consequently confirmed that this treatment induced fast deposition of iron compounds and emulsion on the polypropylene fibers.

COMPARATIVE EXPERIMENT 1

The same treatment as performed in Example 13 was carried out with exclusive use of a cation emulsion. The emulsion was not observed to induce fast deposition of the polypropylene fibers. When the fibers were removed from the solution and then dried, the emulsion formed a film on the surface of the fibers and the individual fibers could not be separated.

When the fibers treated by the method of Example 13 were removed from the solution and dried, they could be easily separated and they possessed satisfactory dispersibility.

EXAMPLE 14

Iron (III) chloride (anhydrous) was dissolved in ethyl alcohol at a ratio of 1 g/liter and ethyl silicate was added to the resultant solution at a ratio of 0.5 g/liter. The mixture was kept heated at 70° C.
and polypropylene fibers placed therein at a ratio of 100 g/liter were kept immersed therein for ten minutes. The fibers immersed in the mixed solution were irradiated with 2,450 MHz microwaves at the rate of 600 W/hr for ten minutes. The treatment was confirmed to induce fast deposition of iron compound and silicon compound on the surface of the fibers.

EXAMPLE 15

Nickel (II) chloride was dissolved in water at a ratio of 10 g/liter. The aqueous solution and hypochlorous acid added thereto were heated (A solution).

Ferric chloride (anhydrous) was dissolved in water at a ratio of 10 g/liter (B solution).

A solution and B solution were equivoluminally mixed and heated to 60° C. To the resultant hot mixed solution, polypropylene fibers were added in a ratio of 100 g/liter, kept in the same condition for 10 minutes, and irradiated with 2,450 MHz microwaves at a rate of 1,200 W/hr for 10 minutes. This treatment was confirmed to induce fast deposition of iron and nickel compounds on the polypropylene fibers.

EXAMPLES 16 TO 18

The fibrous reinforcing material of this invention obtained by the method of Example 1 using polypropylene fibers was cut into fibers 5 mm in length. Various amounts of the cut material were mixed with cement and sand and converted into slurries by addition of water. The slurries were cured to produce civil engineering and construction materials of this invention. The materials were tested for quality. Separately, the materials were applied to wall surfaces with a trowel to test for workability of application and appearance of the finished wall surface. The compositions produced and the results of the tests are shown in Table 3.

COMPARATIVE EXPERIMENTS 2 AND 3

The treatments of Examples 16 to 18 were repeated, except that untreated polypropylene fibers were used in the place of the fibrous reinforcing material of this invention. The cured mixtures were tested for quality in the same manner as in Example 16. The compositions produced and the results of the tests are shown in Table 3.

COMPARATIVE EXPERIMENT 4

The procedure of Example 16 was repeated, except that polypropylene fibers which had been sprayed with 0.9% of polyoxyethylene alkylphenyl ether were used in the place of the fibrous reinforcing material of this invention. The cured mixtures were tested for quality in the same manner as in Example 16. The compositions produced and the results of the tests are shown in Table 3. (In the following description of quality, o stands for satisfactory level, Δ for ordinary level, and x for inferior level, unless otherwise specified.)

ability to sequester cement as compared with a material having no metal oxide deposited fast thereon.

EXAMPLES 19 TO 23

Fibrous reinforcing materials were produced by following the procedure of Example 1, except that the means for effecting fast deposition of metal oxide (means for imparting energy) was varied. The fibrous reinforing materials were treated in the same manner as in Example 16 to produce civil engineering and construction materials of this invention. These materials were tested for quality in the same manner as in Example 16. The compositions produced and the results of the tests are shown in Table 4.

COMPARATIVE EXPERIMENT 5

Using the same procedure as used in Example 1, polypropylene fibers were immersed in a solution, kept immersed therein for 30 minutes, and then removed from the solution. The fibers were treated in the same manner as in Example 16. The material obtained in consequence of this treatment was tested for quality in the same manner as in Example 19. The composition produced and the results of the tests are shown in Table 4.

COMPARATIVE EXPERIMENT 6

A cured mixture was obtained by repeating the pro-

TABLE 3

|  | Example 16 | Example 17 | Example 18 | Comparative Experiment 2 | Comparative Experiment 3 | Comparative Experiment 4 |
|---|---|---|---|---|---|---|
| Composition |  |  |  |  |  |  |
| Fibers (parts by weight) | 0.5 | 1.0 | 2.0 | 1.0 | 2.0 | 1.0 |
| Cement (parts by weight) | 100 | 100 | 100 | 100 | 100 | 100 |
| Sand (parts by weight) | 150 | 150 | 150 | 150 | 150 | 150 |
| Methyl cellulose (parts by weight) | 0.1 | 0.1 | 0.1 | 0.1 | 0.1 | 0.1 |
| Ratio of water to cement | 46 | 52 | 73 | 52 | 73 | 52 |
| Quality |  |  |  |  |  |  |
| Dispersibility of fibers in water | o | o | o | x | x | o |
| Dispersibility of fibers in slurry | o | o | o | x | x | o |
| Workability in application to surface | o | o | o | x | x | o |
| Appearance of coated surface | o | o | o | x | x | o |
| Behavior of fibers in bending | Breakage | Breakage | Breakage | Fall-out | Fall-out | Fall-out |

It was confirmed that the civil engineering and construction material of this invention excelled in dispersibility in water, exhibited satisfactory dispersion in slurry, permitted easy application to a surface, enjoyed good surface appearance, and manifested improved cedure of Example 19, except that untreated polypropylene fibers were used in place of the fibrous reinforcing material of this invention. The composition produced and the results of the test are shown in Table 4.

TABLE 4

|  | Example 19 | Example 20 | Example 21 | Example 22 | Example 23 | Comparative Experiment 5 | Comparative Experiment |
|---|---|---|---|---|---|---|---|
| Means for forming coating | Ex. 1 | Ex. 3 | Ex. 5 | Ex. 9-A | Ex. 6-5 | Soaking for 30 minutes | — |
| Composition |  |  |  |  |  |  |  |
| Fibers (parts by weight) | 1.0 | 1.0 | 1.0 | 1.0 | 1.0 | 1.0 | 1.0 |
| Cement (parts by weight) | 100 | 100 | 100 | 100 | 100 | 100 | 100 |
| Sand (parts by weight) | 150 | 150 | 150 | 150 | 150 | 150 | 150 |
| Methyl cellulose (parts by weight) | 0.1 | 0.1 | 0.1 | 0.1 | 0.1 | 0.1 | 0.1 |
| Ratio of water to cement | 52 | 52 | 52 | 52 | 52 | 52 | 52 |
| Quality |  |  |  |  |  |  |  |
| Dispersibility of fibers in water | o | o | o | o | o | x | x |
| Dispersibility of fibers in slurry | o | o | o | o | o | x | x |

TABLE 4-continued

|  | Example 19 | Example 20 | Example 21 | Example 22 | Example 23 | Comparative Experiment 5 | Comparative Experiment |
|---|---|---|---|---|---|---|---|
| Workability in application to surface | ○ | ○ | ○ | ○ | ○ | Δ | x |
| Behavior of fibers in bending | Breakage | Breakage | Breakage | Breakage | Breakage | Fall-out | Fall-out |

It was confirmed that the same effect was obtained by varying the method of heating and by varying the method of energy wave impartation and that the method for energy impartation is not specific. It was also confirmed that when the treatment was carried out at a low temperature, the time for the treatment was required to be elongated.

EXAMPLES 24 TO 29

The fibrous reinforcing materials of this invention produced by the treatment of polypropylene fibers in Examples 1, 11, 13, 14, and 15 were cut into fibers 5 mm in length. The cut materials were treated in entirely the same manner as in Example 16 to produce civil engineering and construction materials of this invention. These materials were tested for quality in the same manner as in Example 16.

The compositions produced and the results of the tests are shown in Table 5.

COMPARATIVE EXPERIMENT 7

The procedure of Example 24 was repeated, except that untreated polypropylene fibers were used in the place of the fibrous reinforcing material of this invention. The composition produced and the results of the test are shown in Table 5.

The metal species of the metal oxide, hydroxide, and hydroxy-oxide in the material to be deposited fast on the fibers is not limited to iron but may be a simple composition or a complex composition. It was confirmed that a metal in its simple form could be effectively deposited on the fibers as well.

EXAMPLES 29 TO 31

The fibrous reinforcing materials of this invention obtained by treating polymethyl pentene fibers in accordance with the procedure of Example 3 were cut into fibers 5 mm in length. The cut materials were mixed with various powders and kneaded with water to prepare slurries of (powder+fibers+pulp):water=5:100. The slurries and 10 ppm of a fixing agent added thereto were molded with a sheet forming device (produced by Kumagaya Riki Kogyo K. K.), squeezed at a pressure of 20 kg/cm$^2$ to remove water, dried at 20° C. and 65% RH, and examined as to the occurrence of a crack in the dry products.

The dry products were cured in an autoclave at 180° C. for four hours. After the curing, they were tested for bending strength.

The compositions produced and the results of the tests are shown in Table 6.

COMPARATIVE EXPERIMENTS 8 TO 10

The procedure of Example 29 was repeated, except that untreated polymethyl pentene fibers were used instead. The dry products, cured products, and fired products were tested in the same manner as in Example 29. The compositions produced and the results of the tests are shown in Table 6.

TABLE 5

|  | Example 24 | Example 25 | Example 26 | Example 27 | Example 28 | Comparative Experiment |
|---|---|---|---|---|---|---|
| Means for forming coating Composition | Example 1 | Example 11 | Example 13 | Example 14 | Example 15 | — |
| Fibers (parts by weight) | 1.0 | 1.0 | 1.0 | 1.0 | 1.0 | 1.0 |
| Cement (parts by weight) | 100 | 100 | 100 | 100 | 100 | 100 |
| Sand (parts by weight) | 150 | 150 | 150 | 150 | 150 | 150 |
| Methyl cellulose (parts by weight) | 0.1 | 0.1 | 0.1 | 0.1 | 0.1 | 0.1 |
| Ratio of water to cement | 52 | 52 | 52 | 52 | 52 | 52 |
| Quality |  |  |  |  |  |  |
| Dispersibility of fibers in water | ○ | ○ | ○ | ○ | ○ | x |
| Dispersibility of fibers in slurry | ○ | ○ | ○ | ○ | ○ | x |
| Workability in application to surface | ○ | ○ | ○ | ○ | ○ | x |
| Behavior of fibers in bending | Breakage | Breakage | Breakage | Breakage | Breakage | Fall-out |

TABLE 6

|  | Example 29 | Example 30 | Example 31 | Comparative Experiment 8 | Comparative Experiment 9 | Comparative Experiment 10 |
|---|---|---|---|---|---|---|
| Composition |  |  |  |  |  |  |
| Fibers (parts by weight) | 1.5 | 1.5 | 1.5 | 1.5 | 1.5 | 1.5 |
| Cement (parts by weight) | 50 |  |  | 50 |  |  |
| Silica Sand (parts by weight) | 50 |  |  | 50 |  |  |
| Clay (parts by weight) |  | 100 |  |  | 100 |  |
| Diatomaceous earth (parts by weight) |  |  | 50 |  |  | 50 |

TABLE 6-continued

|  | Example 29 | Example 30 | Example 31 | Comparative Experiment 8 | Comparative Experiment 9 | Comparative Experiment 10 |
|---|---|---|---|---|---|---|
| Slaked lime (parts by weight) |  |  | 50 |  |  | 50 |
| Pulp (parts by weight) | 4 | 4 | 4 | 4 | 4 | 4 |
| Quality |  |  |  |  |  |  |
| Dispersibility of fibers in slurry | ○ | ○ | ○ | x | x | x |
| Crack in dry product | Absent | Absent | Absent | Present | Present | Present |
| Bending strength, kgf/cm$^2$, after curing in autoclave | 220 |  | 113 | 190 |  | 99 |
| Test for dispersibility of fibers molded in the form of sheet | ○ | ○ | ○ | x | x | x |

EXAMPLES 32 TO 34

TABLE 7

|  | Example 32 | Example 33 | Example 34 | Comparative Experiment 11 | Comparative Experiment 12 | Comparative Experiment 13 |
|---|---|---|---|---|---|---|
| Composition |  |  |  |  |  |  |
| Kind of fibers | Polypropylene | Polypropylene | Polypropylene | Untreated polypropylene | Vinylon | Asbesto |
| Fibers (parts by weight) | 1 | 1 | 2 | 1 | 1 | 15 |
| Slag (parts by weight) | 40.5 | 43 | 42 | 43 | 43 | 35 |
| Gypsum (parts by weight) | 36 | 38 | 38 | 38 | 38 | 31 |
| Slaked lime (parts by weight) | 4 | 4 | 4 | 4 | 4 | 4 |
| Pearlite (parts by weight) | 10 | 10 | 10 | 10 | 10 | 10 |
| Pulp (parts by weight) | 4 | 4 | 4 | 4 | 4 | 4 |
| Sepiolite (parts by weight) | 4.5 | 0 | 0 | 0 | 0 | 0 |
| Quality |  |  |  |  |  |  |
| Dispersibility of fibers in slurry | ○ | ○ | ○ | x | ○ | ○ |
| Transparency of filtrate | ○ | ○ | ○ | x | Δ | ○ |
| Filtravility to water | ○ | ○ | ○ | ○ | ○ | Δ |
| Dispersibility of fibers during sheet molding | ○ | ○ | ○ | x | Δ | ○ |
| Dispersibility of pulp during sheet molding | ○ | ○ | ○ | x | Δ | ○ |
| Bending strength kgf/cm$^2$ |  |  |  |  |  |  |
| Longitudinal direction | 127 | 121 | 125 | 96 | 120 | 130 |
| Lateral direction | 95 | 85 | 88 | 67 | 68 | 128 |
| Ratio of sheet molding speed (%) | 100 | 100 | 100 | — | 60 | 100 |

The fibrous reinforcing materials of this invention obtained by treating polypropylene fibers by following the procedure of Example 3 were cut into fibers 5 mm in length. The cut materials were kneaded with a slag-gypsum type composition to prepare slurries of solid (powder+fibers+pulp+aggregate):water=5:100.

The slurries and a fixing agent ("Sunflock AH 330P" produced by Sanyo Kasei K.K.) added thereto at a concentration of 10 ppm were molded with a wet type Fourdrinier machine. The produced sheets were pre-cured at 35° C. and >80% RH for three days and then normally cured at 60° C. and >80% RH for 10 hours. They were cured again at 26° C. and 65% RH for seven days.

The compositions produced and the results of the quality tests are shown in Table 7.

COMPARATIVE EXPERIMENTS 11 TO 13

The procedure was repeated, except that untreated polypropylene fibers, vinylon fibers, and asbestos were used instead. The compositions produced and the results of the quality tests are shown in Table 7.

EXAMPLES 35 TO 38

Fibrous reinforcing materials of this invention were produced by treating various kinds of fibers in accordance with the procedure of Example 4. They were cut into fibers 5 mm in length. The cut materials were mixed with cement and highly beaten pulp and molded into sheets by the method of Example 29 to produce sheetlike molded products. The compositions produced and the various properties thereof are shown in Table 8.

COMPARATIVE EXPERIMENTS 14 TO 18

Sheetlike molded products were obtained by following the procedure of Example 35, except that various kinds of untreated fibers were used instead.

The compositions produced and the properties thereof are shown in Table 8.

TABLE 8

|  | Example 35 | Example 36 | Example 37 | Example 38 | Comparative Experiment 14 | Comparative Experiment 15 | Comparative Experiment 16 | Comparative Experiment 17 | Comparative Experiment 18 |
|---|---|---|---|---|---|---|---|---|---|
| Composition |  |  |  |  |  |  |  |  |  |

TABLE 8-continued

|  | Example 35 | Example 36 | Example 37 | Example 38 | Comparative Experiment 14 | Comparative Experiment 15 | Comparative Experiment 16 | Comparative Experiment 17 | Comparative Experiment 18 |
|---|---|---|---|---|---|---|---|---|---|
| Kind of fibers | Polypropylene | Methylpentene | Vinylon | Acryl | Polypropylene | Methylpentene | Vinylon | Acryl | Asbesto |
| Means for depositing oxide, etc. | Exam. 4 | Exam. 4 | Exam. 4 | Exam. 4 | — | — | — | — | — |
| Amount of fibers (parts by weight) | 1.5 | 1.5 | 1.5 | 1.5 | 1.5 | 1.5 | 1.5 | 1.5 | 1.5 |
| Cement (parts by weight) | 100 | 100 | 100 | 100 | 100 | 100 | 100 | 100 | 100 |
| Highly beaten pulp (parts by weight) | 4 | 4 | 4 | 4 | 4 | 4 | 4 | 4 | 4 |
| Quality |  |  |  |  |  |  |  |  |  |
| Dispersibility of fibers water | o | o | o | o | o | o | o | o |  |
| Dispersibility of fibers in slurry | o | o | o | o | x | x | o | o | o |
| Filtrability to water during sheet molding | o | o | o | o | x | x | o | o | o |
| Transparency of filtrate during sheet molding | o | o | o | o | — | — | Δ | Δ | Δ |
| Dispersibility of fibers during sheet molding | o | o | Δ | Δ | — | — | Δ | Δ | o |
| Dispersibility of pulp during sheet molding | o | o | o | o | — | — | Δ | Δ | o |
| Ratio of sheet molding speed | 100 | 100 | 90 | 90 | — | — | 60 | 60 | 100 |

The Examples 35 and 36 were superior in every respect to the comparative experiments. The Examples 37 and 38 were superior to the comparative experiments in all respects except for the dispersibility of fibers during sheet molding. Comparative Experiment 18 covered asbestos. It was confirmed that the civil engineering and construction materials of this invention were substantially equal in quality to asbestos.

EXAMPLES 39 TO 42

Fibrous reinforcing materials of this invention were obtained by following the procedure of Example 1, except that other kinds of fibers were used in the place of the polypropylene fibers. From these materials, civil engineering and construction materials of this invention were produced by following the procedure of Example 29, except that various kinds of fibers were used in the place of the pulp. Thus, sheetlike molded products were obtained. The compositions produced and the results of the quality tests are shown in Table 9.

COMPARATIVE EXPERIMENTS 19 TO 22

Sheetlike molded products were obtained by repeating the procedure of Example 39, except that untreated fibers were used instead. The compositions produced and the results of the test for quality are shown in Table 9.

hanced bending strength and gain improvement in various qualities.

The properties of the products of the working examples and comparative experiments cited above were rated as follows.

Test for dispersibility of fibers in water:
1.0 part by weight of sample fibers were stirred into 100 parts by weight of water. The resultant dispersion was visually examined to rate the condition of dispersion of the fibers on a three-point scale, wherein o stands for satisfactory dispersion of fibers, Δ for fiber collection at water surface but fiber surface wetted, and x for lack of sufficient dispersion of fibers.

Workability in application to surface:
A sample was applied to a wall surface (of concrete) with a trowel to rate the degree of ease of application on a two-point scale, wherein o stands for high ease of application and x for absence of ease of application.

Behavior of fibers in bending:
A test piece for bending was plunged into an aqueous 10% hydrochloric acid solution in such a manner that part of a cut face thereof entered the solution, left immersed to a depth of about 5 mm therein for one week, removed from the solution, washed with water, and visually examined as to the condition of dispersion of fibers and the condition of cutting.

Appearance of applied coating:

TABLE 9

|  | Example 39 | Example 40 | Example 41 | Example 42 | Comparative Experiment 19 | Comparative Experiment 20 | Comparative Experiment 21 | Comparative Experiment 22 |
|---|---|---|---|---|---|---|---|---|
| Kind of fibers | Pulp | Cellulose | Slag wool | Mica | Pulp | Cellulose | Slag wool | Mica |
| Amount of fiber (parts by weight) | 5 | 5 | 10 | 20 | 5 | 5 | 10 | 20 |
| Cement (parts by weight) | 100 | 100 | 100 | 100 | 100 | 100 | 100 | 100 |
| Dispersibility of fibers in slurry | o | o | o | o | o | o | o | o |
| Filterability to water during sheet molding | o~Δ | o~Δ | o | o | Δ | Δ | o | o |
| Transparency of filtrate during sheet molding | o | o | o | o | o | o | x | x |
| Bending strength of molded product, kgf/cm$^2$ | 157 | 132 | 216 | 256 | 110 | 113 | 160 | 215 |

The working examples and the comparative experiments clearly indicate that when the fibers, both organic and inorganic, are treated as contemplated by this invention, the molded products obtained enjoy en- The surface was visually examined and rated on a three-point scale, Wherein o stands for uniform coating and absence of phase separation, Δ for discernible phase separation in the longitudinal direction (the direction of motion of filtering water during sheet molding) in spite of uniform coating, and x for lack of uniform coating.

Test for filtrability to water:

A slurry of water:solid contents=100:5 was passed through a metallic gauze of 100 mesh to determine the speed of filtration. The relative speed of filtration within the test unit was rated on a three-point scale, wherein o stands for relatively quick filtration, Δ for an intermediate speed between o and x, and x for slow filtration.

Test for transparency of filtrate:

Ten (10) liters of a slurry of water:solid contents=100:5 was passed through a metallic gauze of 100 mesh.

At the stage at which the total volume of filtrate reached about 5 liters, the filtrate was sampled and visually examined as to transparency and rated on a three-point scale, in which o stands for absence of conspicuous solids after refiltration with a filter paper, JIS 5A, Δ for discernible occurrence of solids after refiltration with a filter paper, JIS 5A in spite of nearly transparent flitrate, and x for presence of discernible solids in the filtrate.

Dispersibility of fibers:

A sheet molded plate was cured once and kept immersed in an aqueous 5% hydrochloric acid solution for one week to dissolve out the cement component. The treated plate was stripped of parts embrittled by corrosion with the acid. The newly exposed surface of the plate was visually examined as to the condition of dispersion of fibers. The observed dispersion was rated on a three-point scale, wherein o stands for absence of fiber orientation, a sign of thorough dispersion, Δ for presence of discernible fiber orientation, a sign of re-separation of fibers and lack of thorough dispersion, and x for re-separation of fibers, a sign of insufficient separation.

Dispersibility of pulp:

A sheet-molded plate was left to cure for one day and then kept immersed in an aqueous 5% hydrochloric acid solution for one week to dissolve out the cement component. The treated plate was stripped of parts embrittled by corrosion with the acid. The newly exposed surface of the plate was visually examined as to the condition of dispersion of pulp. The condition of dispersion was rated on a three-point scale, wherein o stands for thorough dispersion and uniform distribution of pulp, Δ for presence of barely discernible collection of pulp under the surface of the plate, and x for presence of conspicuous collection of pulp in the upper layer of the plate, a sign of re-separation.

Ratio of sheet molding speed:

The sheet molding speed not causing notable orienting of fibers was expressed in terms of the ratio thereof to the sheet molding speed of an asbestos-containing composition.

The civil engineering and construction grade fibrous reinforcing material of this invention which has deposited fast on a fibrous substance at least one member selected from among metal oxides, metal hydroxides, and metal hydroxy-oxides is easily produced and is useful for the production of civil engineering and construction materials. To be specific, the construction materials contemplated by this invention comprise the fibrous reinforcing material of this invention, a hydraulic material, a siliceous inorganic material, clay, etc. The construction material produced in the form of a molded plate, for example, can be used in ceilings and walls of buildings. This molded plate is non-combustible, excels in weatherability and can be effectively used in the same manner as various asbestos-containing molded plates.

It is clear from the working examples and comparative experiments cited above that the civil engineering and construction grade fibrous reinforcing material of this invention and the civil engineering and construction materials of this invention containing the reinforcing material possess outstanding qualities.

INDUSTRIAL APPLICABILITY

The civil engineering and construction grade fibrous reinforcing material of this invention can substitute for asbestos. The civil engineering and construction materials which have the fibrous reinforcing material incorporated in inorganic refractory substances enjoy very high practical utility because they can be used substantially in the same manner as those which contain asbestos.

We claim:

1. A civil engineering and construction grade fibrous reinforcing material consisting essentially of (a) a fibrous substance and (b) at least one inorganic metal compound, said compound being selected from the group consisting of oxides, hydroxides and hydroxy-oxides of metals selected from the group consisting of Si, Ti, V, Cr, Mn, Fe, Co, Ni, Cu and Al, and deposited fast on said fibrous substance by a process comprising forming an aqueous solution by dissolving a relatively strong acid salt of at least one of said metals in water, contacting said fibrous substance in the absence of resinous compound with said solution, and imparting energy to said fibrous substance-contacting resin-free solution of said metal salt.

2. A civil engineering and construction grade fibrous reinforcing material according to claim 1, wherein said fibrous substance is fibers having a polyolefin substantially as a main component thereof.

3. A civil engineering and construction grade fibrous reinforcing material according to claim 2, wherein said polyolefin fibers are polypropylene fibers.

4. A civil engineering and construction grade fibrous reinforcing material according to claim 1, wherein the gravimetric ratio of (a):(b) is in the range of 1:0.0001–0.2.

5. A civil engineering and construction grade fibrous reinforcing material according to claim 1, wherein the metal of said metal oxides, metal hydroxides, and metal hydroxy-oxides is divalent or trivalent Fe.

6. A civil engineering and construction grade fibrous reinforcing material according to claim 1, wherein the diameter of said fibrous substance is in the range of from 0.1 to 100 microns.

7. A civil engineering and construction grade fibrous reinforcing material as set forth in claim 1 wherein said metal salt is a salt of an acid selected from the group consisting of hydrochloric acid, sulfuric acid, sulfurous acid, nitric acid, nitrous acid, phosphoric acid, phosphorous acid, hypophosphorous acid, oxalic acid, tartaric acid and citric acid.

8. A civil engineering and construction material having a civil engineering and construction fibrous reinforcing material according to claim 1 incorporated as a reinforcement in an inorganic refractory substance.

9. A civil engineering and construction material according to claim 8, wherein said inorganic refractory substance is selected from the group consisting of cement, fly ash, slag, gypsum, silica and mixtures thereof.

10. A civil engineering and construction material according to claim 8, wherein said inorganic refractory substance has a silicious inorganic compound as a main component thereof.

11. A civil engineering and construction material according to claim 8, wherein said inorganic refractory substance is fired clay.

12. A civil engineering and construction material according to claim 8, wherein said fibrous reinforcing material comprises polypropylene fibers having fast deposited thereon at least one member selected from the group consisting of iron oxide, iron hydroxide and iron hydroxy-oxide.

13. A civil engineering and construction material according to claim 8, wherein the gravimetric ratio of inorganic refractory substance:fibrous reinforcing material is in the range of 100:0.01–40.

14. A method for the production of a civil engineering and construction grade fibrous reinforcing material consisting of a fibrous substance and at least one inorganic metal compound selected from the group consisting of oxides, hydroxides and hydroxy-oxides of metals selected from the group consisting of Si, Ti, V, Cr, Mn, Fe, Co, Ni, Cu and Al, said metal compound(s) being deposited fast on said fibrous substance, which method comprises a step of forming an aqueous solution of at least one relatively strong acid salt of said metals by dissolving said salt in water in the absence of a resinous compound, immersing a fibrous substance in the resin compound-free mix solution, and imparting energy to said mix solution and/or adjusting the pH value of said mix solution, and a step of dewatering the treated mix solution on said fibrous substance.

15. A method according to claim 14, wherein the energy imparted is energy waves.

16. A method according to claim 15, wherein said energy waves are at least one member selected from the group consisting of very-high frequency waves, ultraviolet light, milliwave waves, and microwaves.

17. A method according to claim 14, wherein the energy imparted is generated by heating.

18. A method according to claim 17, wherein said heating is at least one form selected from the group consisting of convective flow of heat, conduction of heat, radiation of heat, and infrared heating.

19. A method according to claim 14, wherein said fibrous substance is fibers having a polyolefin substantially as a main component thereof.

20. A method according to claim 19, wherein said polyolefin fibers are polypropylene fibers.

21. A method according to claim 14, wherein the diameter of said fibrous substance is in the range of from 0.1 to 100 microns.

22. A method according to claim 14, wherein said step of immersion is followed by said step of energy impartation or pH value adjustment.

23. A method according to claim 14, wherein said step of energy impartation or pH value adjustment is followed by said step of immersion.

24. A method according to claim 14, wherein the metal of said metal oxides, metal hydroxides, and metal hydroxy-oxides is divalent or trivalent Fe.

25. A method according to claim 14, wherein said metal salt is a chloride.

26. A method for the production of a civil engineering and construction grade fibrous reinforcing material as set forth in claim 14 wherein said metal salt is a salt of an acid selected from the group consisting of hydrochloric acid, sulfuric acid, sulfurous acid, nitric acid, nitrous acid, phosphoric acid, phosphorous acid, hypophosphorous acid, oxalic acid, tartaric acid and citric acid.

27. A method for the production of a civil engineering and construction grade fibrous reinforcing material consisting of a fibrous substance and at least one metal compound selected from the group consisting of oxides, hydroxides and hydroxy-oxides of metals selected from the group consisting of Si, Ti, V, Cr, Mn, Fe, Co, Ni, Cu and Al, and deposited fast on said fibrous substance, which method comprises the steps of dissolving at least one relatively strong acid inorganic salt of said metals in water in the absence of a resinous compound, immersing a fibrous substance in the resin compound-free aqueous solution obtained in the preceding step, and removing said fibrous substance from said mix solution and imparting energy to said fibrous substance.

28. A method for the production of a civil engineering and construction grade fibrous reinforcing material as set forth in claim 27 wherein said metal salt is a salt of an acid selected from the group consisting of hydrochloric acid, sulfuric acid, sulfurous acid, nitric acid, nitrous acid, phosphoric acid, phosphorous acid, hypophosphorous acid, oxalic acid, tartaric acid and citric acid.

* * * * *